United States Patent [19]
Stessen

[11] Patent Number: 4,753,171
[45] Date of Patent: Jun. 28, 1988

[54] CARRIER PROJECTILE FOR SUBMUNITION

[75] Inventor: Lothar Stessen, Lauf, Fed. Rep. of Germany

[73] Assignee: Diehl GmbH & Co., Nuremberg, Fed. Rep. of Germany

[21] Appl. No.: 16,547

[22] Filed: Feb. 19, 1987

[30] Foreign Application Priority Data

Mar. 12, 1986 [DE] Fed. Rep. of Germany ....... 3608107

[51] Int. Cl.$^4$ ......................... F42B 13/54; F42B 25/02
[52] U.S. Cl. .................................... 102/387; 102/354; 102/393
[58] Field of Search .............. 102/489, 386, 387, 393, 102/337–340, 348, 351, 354

[56] References Cited

U.S. PATENT DOCUMENTS

| 3,719,339 | 3/1973 | Simmons et al. | 102/340 X |
| 3,730,099 | 5/1973 | Schopp | 102/339 |
| 3,834,312 | 9/1974 | Simmons | 102/339 |
| 3,946,672 | 3/1976 | Adams et al. | 102/393 X |
| 4,013,009 | 3/1977 | Claude et al. | 102/339 |
| 4,226,185 | 10/1980 | Tobler et al. | 102/340 |
| 4,333,400 | 6/1982 | McNelia et al. | 102/387 X |
| 4,372,215 | 2/1983 | Crepin | 102/387 |
| 4,498,393 | 2/1985 | Fischer et al. | 102/489 X |
| 4,651,648 | 3/1987 | Alon | 102/387 |

FOREIGN PATENT DOCUMENTS

2738031 3/1978 Fed. Rep. of Germany .
50802 4/1941 France .

OTHER PUBLICATIONS

Defense Electronics, Industry News, Jun. 1985, p. 49.

Primary Examiner—David H. Brown
Attorney, Agent, or Firm—Scully, Scott, Murphy & Presser

[57] ABSTRACT

A carrier projectile for aerodynamically braked submunition which can be ejected rearwardly from the tail end of the carrier projectile while contacting a cup-shaped base of the projectile. The carrier projectile has the inner edge of the fabric of a braking sail retained within the cup-shaped recess of the base of the projectile, with the outer edge of the fabric of the sail being equipped with centrifugal masses or flyweights mounted in proximity to the opening of the cup-shaped recess in the base. Provision is made to arrange the fabric of a radially outwardly tensionable braking sail in the already available recess in the base of the projectile, the braking sail being extended through the pulling action exerted thereon from the centrifugal flyweights.

7 Claims, 2 Drawing Sheets

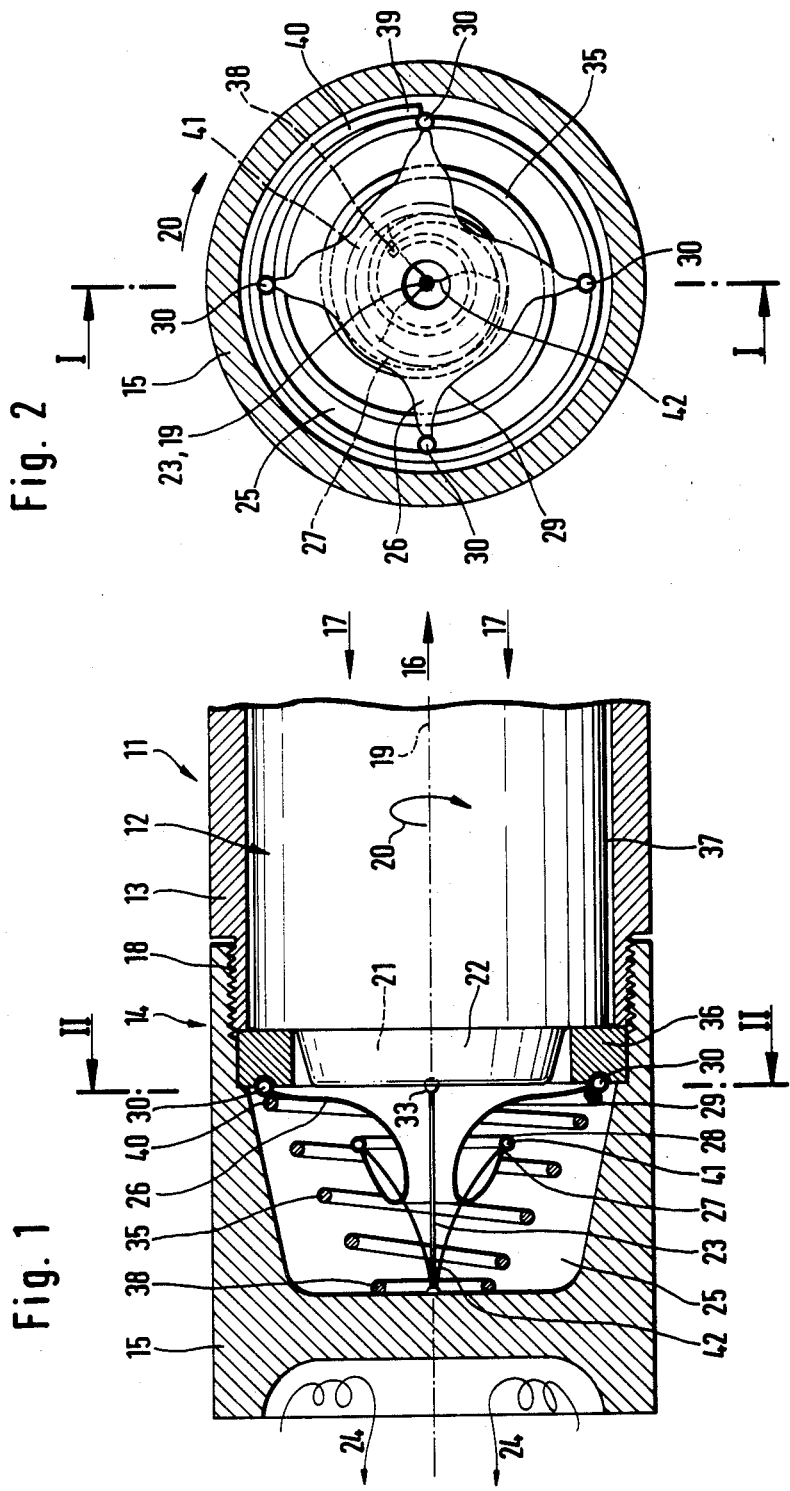

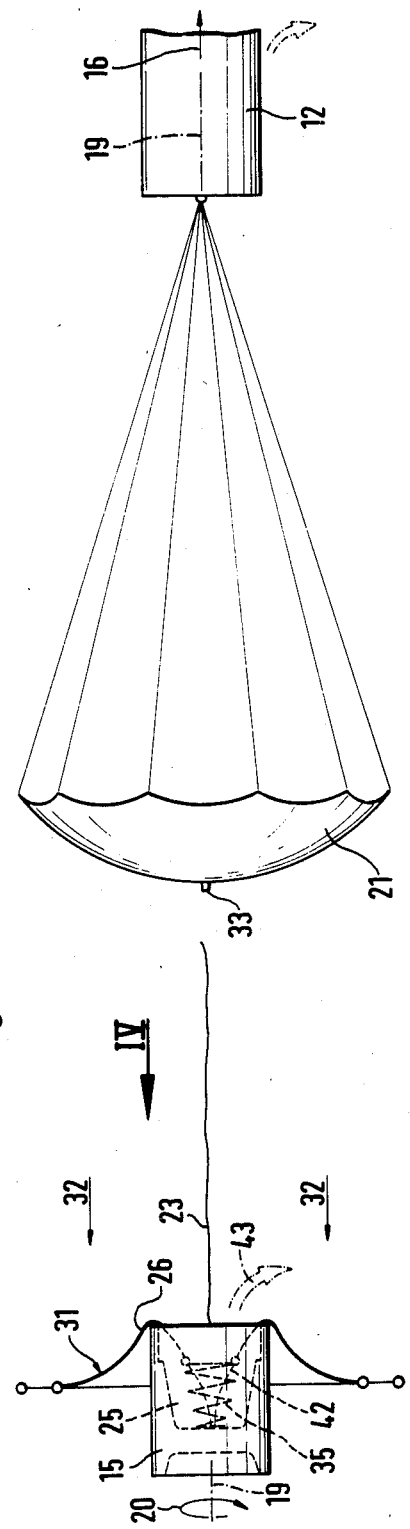
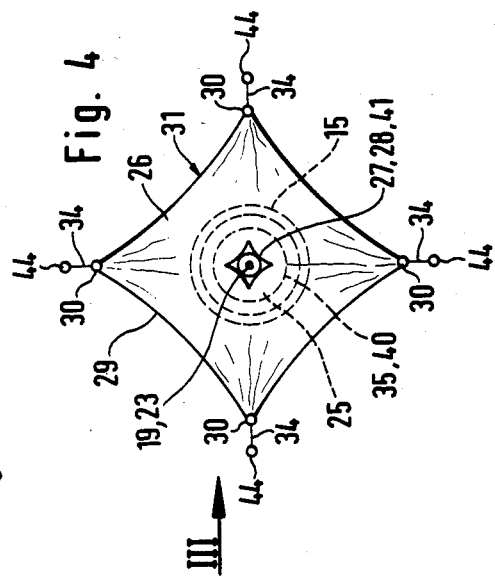

CARRIER PROJECTILE FOR SUBMUNITION

BACKGROUND OF THE INVENTION

1. Field of the Invention

The present invention relates to a carrier projectile for aerodynamically braked dischargeable submunition which can be ejected rearwardly from the tail end of the projectile under contact against the base of the projectile.

2. Discussion of the Prior Art

A carrier projectile of the type under consideration and the mode of operation of the submunition which is to be deployed thereby, are described in the publication DEFENSE ELECTRONICS, June 1985, page 49 upper right.

SUMMARY OF THE INVENTION

It is an object of the present invention to so equip a carrier projectile of the kind for submunition which is rearwardly ejectable (and especially brakeable through the intermediary of parachutes), so as to ensure the secure raising away of the base of the projectile from the rearwardly located submunition for the build up of the aerodynamic braking means of the latter without encountering the danger of it being damaged through the approaching base of the projectile from therebehind.

The foregoing object is inventively achieved in that the carrier projectile has the inner edge of the fabric of a braking sail retained in the interior space of the projectile base, wherein the outer edge of the fabric is equipped with centrifugal masses or flyweights in proximity to an opening in the interior of the base.

Thus, in accordance with the foregoing, provision is made to arrange the fabric of a radially outwardly tensionable braking sail in the already available interior space in the base of the projectile, which braking sail is extended by means of the centrifugal flyweights.

The resultant increase in the moment of inertia and in the contacting surface for the oncoming airflow lead to an extremely intense braking down of the translatory and the rotational movements of the projectile base relative to the initially still unbraked movement of the submunition which is similar rearwardly expelled from the carrier projectile. As a result, on the one hand, there is ensured that the rip cord from the base to the last braking parachute is tensioned, and the last-mentioned is pulled out of its packing container; whereas, on the other hand, the reduction in the movement at the base leads to a steep drop or descent thereof into a path deviating from the momentary trajectory of the submunition, so as to securely avoid any danger of damage being encountered by the extended tensioned braking parachute through a possibly rearwardly approaching flying base.

Expediently, the raising away of the projectile base from the rearwardly located submunition is assisted by a spring which is supported in the interior of the base, which concurrently displaces the centrifugal masses or flyweights, together with the outer edge of the braking sail fabric which is fastened thereto, forwardly into the separating plane; such that on the basis of the spin of the projectile base, the flyweight masses will be propelled or accelerated radially outwardly through an annular slit which opens during the raising away, and which pull the fabric out of the interior of the base, so as to tension it in a radially ring-shaped configuration into the braking sail.

BRIEF DESCRIPTION OF THE DRAWINGS

Additional alternatives and embodiments, as well as further features and advantages of the invention can now be readily ascertained from the following detailed description of a generally schematically illustrated exemplary embodiment thereof, taken in conjunction with the accompanying drawings; in which:

FIG. 1 illustrates a longitudinal sectional view of the tail end region of a carrier projectile with submunition of the same caliber arranged therein in front of the container or cup-shaped base of the projectile;

FIG. 2 illustrates a sectional view taken along line II—II in FIG. 1, showing a braking sail fabric stored in the projectile base;

FIG. 3 illustrates the projectile base, subsequent to the shearing off of the remaining carrier projectile, which has been braked down by means of a radially extended braking sail, which has pulled out the braking parachute of the neighboring submunition; and FIG. 4 illustrates an end view of the extended braking sail in front of the base pursuant to FIG. 3.

DETAILED DESCRIPTION

The carrier projectile 11 for the deployment of intelligent (sensor-detonated and/or final flight-phase maneuverable) submunition 12, which descends parachute-braked after ejection into the target area, possesses a hollow-cylindrical shell or casing 13 which, in the region of the tail end of the projectile 14, is closed off by means of a mechanically extremely sturdily constructed container or cup-shaped base 15. In the illustrated, preferred exemplary embodiment, the submunition 12 possesses practically the same caliber as the carrier projectile 11, in which it practically completely fills out the cross-section of the interior of the casing 13.

When the carrier projectile 11 after its firing, for example, from a howitzer, flies over the previously identified target area, then the articles of submunition 12 which are carried along therewith, are ejected through the region of the tail end 14 of the projectile; in effect, opposite the direction of flight of the projectile 16, out of the carrier projectile 11.

For this purpose, in the nose region (not shown) of the carrier projectile 11 there is detonated an ejection-propellent charge, which is known per se from the submunition technology, such that by means of the reaction gases thereof, it exerts a longitudinal thrust 17 opposite the direction of flight 16, on the coaxial packing of the articles of submunition 12 which are transported within the casing 13. At a sufficiently intensely rising longitudinal thrust 17, the connecting threads 18 of the base will shear in the fastening region between the base 15 and the casing 13; in essence, the base 15 with the packing of the articles of submunition 12 located ahead thereof, are pushed out rearwardly in parallel with the common axis 19 from the carrier casing 13.

Inasmuch as a carrier projectile 11 of the type under consideration herein, at a high speed in the direction of flight 16, possesses an extremely intense stabilizing spin 20 about its longitudinal axis 19, which is also transmitted through the packing in the casing 13 to the articles of submunition 12 which are to be ejected, and inasmuch as the resultant rearwardly directed speed of ejection is relatively small in comparison with that in the direction of flight 16, the assembly or structure moves out of the projectile base 15, and the articles of submunition 12 arranged coaxially ahead thereof moves spin-stabilized further in the direction of the original trajectory 16. Although the base 15 and the articles of submunition 12 do not possess any constructive connection among each other, this arrangement is, however, kinetically extremely stable or sturdy due to the high gyroscopic forces.

For the functioning of the articles of submunition 12, these must be raised away in sequence from each other, the rearward ones first, in order to thereby be able to presently pull out the braking parachute 21 located in front thereof, from the packing cup container 22 located rearwardly against the submunition 12. The parachute 21 of the rearwardly located submunition 12 is to be pulled out therefore as the first; namely, through a rip chord 23, from the axially remaining base 15.

For this purpose there must be initially made provision that the movement of the base 15 is braked relative to those of the articles of submunition 12, such that a pull can be exerted on the rip cord 23; and thereafter provision must be made that, during the braking of the rearward submunition 12 (due to its unfolding braking parachute 21) the base 15, which again moves more rapidly relative to the submunition 12, will not fly rearwardly into the parachute 21 and thereby destroy the latter.

A certain braking force acts retardingly on the base 15 due to the fact that a suction force 24 is built up behind the projectile base 15 as a result of the vacuum which is generated by the flow conditions. However, this is only adequate at a relatively extremely small mass of the base 15, in order to separate because of the gyroscopic forces the dynamically so stable connection between the base 15 and the packing for the articles of submunition 12 located ahead thereof. A base 15 with an extremely small mass or weight, on the other hand, cannot be realized in a carrier projectile 11 of the type under consideration, inasmuch as the tremendous longitudinal and rotational forces, which are imposed on the projectile 11 during its firing from a weapon barrel or launch tube, must be transmitted through the piston-action of the base 15 within the firing barrel. Consequently, care must be taken that additional braking forces act on the heavy-weight base 15, so as to retard the latter so extensively relative to the momentary velocity of the articles of submunition 12, that the parachute rip cord 23 is tensioned relative to the rearward submunition 12 which, in effect, is located ahead of the base 15.

For this build-up of additional braking forces, the cloth or fabric 26 of a braking sail is stored in the interior 25 of the cup-shaped base 15; in effect, behind the rearwardly located submunition 12 or its packing container 22, the inner edge 27 of the fabric being anchored to the base 15 through a fastening device 28. The outer edge 29 which possesses a greater circumference then the inner edge 27, and which is folded into the interior of the base, is equipped along its circumference at symmetrically spaced points with a plurality of flyweights or centrifugal masses 30.

When due to any kind of reason, for instance, as a result of the effect of the suction forces 24, the base 15 is only slightly delayed or held back relative to the momentary movement of the submunition 12, then because of the raising away of the rearward submunition 12 from the base 15, there is formed a circumferentially extending annular gap in the separating plane, through which there can exit the flyweights or centrifugal masses 30; and accelerated radially outwardly due to the high spin 20, such that under the exertion of a significant centrifugal force the folded-in fabric 26 is pulled out from the interior 25 of the base, and tensioned into a radially extended braking sail 31 peripherally surrounding the base, in which there is caught the oncoming airflow 32, as is illustrated in FIGS. 3 and 4. As a result, the base 15 is braked down practically suddenlike in comparison with the momentary speed of the articles of submunition 12, and the rip cord 23 is tensioned, and can thereby pull out the braking parachute 21 of the rearward submunition 12. The fastening location 33 to the parachute 21 will then tear off, so that the braking parachute 21 can uninterruptedly unfold and, through the braked-down submunition 12, can pull out the applicable parachute of the submunition in front thereof (not shown).

Because the intense increase in the moment of inertia of the base 15 under radially extended flyweights or centrifugal masses 30 there is encountered not only an extremely rough reduction in the movement in the direction along the longitudinal axis 19 of the base, in effect, an increase in the distance to the parachute 21, but also an intense reduction in the spin 20 of the base. As a consequence of the braking action of the sail 31, the base 15 also gradually leaves the previous trajectory (symbolically illustrated in FIG. 3 by the phantom-line arrow 43); so that finally, in any case, there is no longer any danger present that the base 15 can thereafter still fall rearwardly into the parachute 21 which is braking on its turn. When, as a result of the reduction of the spin 20, the centrifugal forces which are exerted by the flyweights 30 are no longer sufficient to maintain the braking sail 31 radially tensioned against the force of the onflow of the surrounding air 32, this braking effect is then lost, inasmuch as the fabric of the sail 31 will contact rearwardly against the outer contour of the base 15; however, there is now no longer any danger of damage being sustained by the parachute 21, inasmuch as the base 15 has already heretofore undergone a transition into an intensely braked and unstable flight; in effect, moves along another (falling) trajectory, then this results in the parachute-braked descent of the submunition 12 into the target area.

In order to simplify the representation (as shown in FIGS. 2 and 4), in the illustrated embodiment four flyweights or centrifugal masses 30 are distributed about the outer edge 29 of the braking sail fabric 26. For example, in order to uniformly stretch out a larger surface with higher tensile forces, there can also be provided larger numbers of flyweights 30.

In FIGS. 3 and 4 it is considered that it can be expedient to provide, in addition to the actual flyweights 30 (for tensioning the braking sail fabric 26), separate additional weights 44, which are fastened through lines 34 to the actual centrifugal flyweights 30. This provides the advantage that upon the opening of the annular gap between the base 15 and the rearward submunition 12, the exit of the masses or weights will not be hindered by the folded-in fabric 26. The initially practically undisturbedly egressing auxiliary weights 44, through the pull exerted on the lines 34, displace the actual flyweights 30 in the area of the exit slot, so that the fabric 26 can be pulled out and tensioned out into a radially ring-shape to form the braking sail 31.

Instead thereof, or in addition thereto, as is considered in the drawing, provision can be made that at least the individual centrifugal flyweights 30 are subjected to elastic or spring forces in the direction of flight 16, and thereby during the course of the raising away of the base 15 from the rearward submunition 12, are slid forwardly towards the separating plane so as to be able to be thrown or accelerated radially outwardly through the annular gap. Hereby, these spring forces concurrently support the separating sequence between the base 15 and the rearward submunition 12, when the springs 35 are supported, on the one hand, in the interior of the base 25 and, on the other hand (for example, by means of the centrifugal masses 30), against the rearward submunition 12. In the exemplary case, such as in FIG. 1, this support is effected through a segmented adapter or intermediate ring 36 forming a pressure transmitter for the longitudinal thrust 17, which is exerted by the longitudinal walls 37 of the submunition against the base 15. Suitably, the intermediate ring 36 is profiled so that it exerts a clear axial and particularly peripheral surface-contacting support for the centrifugal flyweights 30 (and when present, weights 44), so that these will not be peripherally displaced upon the initiation of the firing spin 20 with a resultant twisting of folded fabric 26. The compressive force of the spring 35 provides for the raising away of the articles of submunition 12 from the base 15 so that, by means of the springs 35, the intermediate ring 36 which is initially divided into a plurality of segments, is conducted into the separating plane and then can fly radially away. As a result, there are released the centrifugal flyweights 30 (and when present, 44) for effecting the radial extension of the braking sail 31.

In view of the high firing acceleration of the projectile 11, an effort is made to obtain a high buckling strength for the springs 35; in essence, a smaller quotient of spring length to spring diameter. For this purpose, it is expedient that not each one of the centrifugal flyweights 30 has its own cylindrical coil spring associated therewith, but rather the to build in a single helical or frusto-conical spiral spring, which is supported at its rearward end 38 possessing a smaller diameter in the interior 25 of the projectile base 15; whereas the end 39 of the spiral spring which has the larger diameter presses with its uppermost winding 40 (refer to FIG. 2) in an axially-parallel manner against the centrifugal flyweights 30.

As a result of the foregoing, there is also provided in the center of this end surface 39, space for the provision of the fastening device 28 for the inner edge 27 of the fabric 26. At this location, in order to avoid localized high stresses, it is expediently slung about a retaining ring 41 which in turn, can be anchored to the base 15 through lines 42 (FIG. 1). An improved utilization of the interior 25 of the base under simplified assembling condition is obtained when the retaining ring 41 is fastened to the spring 35, in the region of its largest winding 40, and fastened together therewith in the base 15 (not shown in the drawing); such that the fastening plane of the fabric 26 is axially distant from the base 15 through the spring winding 40 which is slid ahead over the separating plane formed by the annular gap, so as to avoid any localized high stresses along sharp edges.

What is claimed is:

1. In a carrier projectile for aerodynamically-braked deployable submunition which is ejectable rearwardly from the tail end of said projectile while contacting a projectile base having a cup-shaped recess facing said projectile; the improvement comprising: a braking sail fabric having an inner edge thereof retained within the cup-shaped recess of said projectile base; and centrifugal flyweights being fastened to an outer edge of said sail fabric proximate the opening of said recess in the projectile base.

2. A carrier projectile as claimed in claim 1, wherein auxiliary weights are arranged within the recess in said projectile base in proximity to the outer edge of said sail fabric; and fastening lines anchoring said auxiliary weights to the centrifugal flyweights.

3. A carrier projectile as claimed in claim 1, wherein a segmented spacer ring is arranged in the region of a separating plane between the rearwardmost submunition and the projectile base, said intermediate ring imparting a definite positioning to the flyweights upon separation of the base from the projectile.

4. A carrier projectile as claimed in claim 1, wherein the centrifugal flyweights are supported axially-parallel, resiliently-biased against the inner peripheral wall of said projectile base proximate the opening of said cup-shaped recess.

5. A carrier projectile as claimed in claim 4, wherein a frusto-conical helical coil spring is arranged within the recess in said projectile base, saisd spring having the smaller diameter end thereof supported against the bottom of said cup-shaped recess in said projectile base and the larger diameter end thereof supported against said centrifugal flyweights.

6. A carrier projectile as claimed in claim 4, wherein a retainer ring is arranged in the cup-shaped recess in the base, the inner edge of the braking sail fabric being fastened to said retainer ring.

7. A carrier projectile as claimed in claim 6, wherein the retainer ring is fastened to the largest diameter winding of the frusto-conical coil spring.

* * * * *